April 16, 1940.     R. L. NEILL     2,197,480
CLUTCH CONTROL MECHANISM
Original Filed Feb. 2, 1935    2 Sheets-Sheet 2

INVENTOR
ROBERT LESLIE NEILL
BY
ATTORNEY

Patented Apr. 16, 1940

2,197,480

UNITED STATES PATENT OFFICE 2,197,480

CLUTCH CONTROL MECHANISM

Robert Leslie Neill, Birmingham, England, assignor to Bendix Aviation Corporation, South Bend, Ind., a corporation of Delaware Original application February 2, 1935, Serial No. 4,705. Divided and this application October 23, 1937, Serial No. 170,519. In Great Britain February 2, 1934

4 Claims. (Cl. 192—.01)

This invention relates to motor vehicle clutches of the kind in which the clutch for connecting the engine to the gear box can be placed under the control of fluid pressure, and, more particularly, in which the suction in the intake manifold of the engine is employed for releasing the clutch. In one known arrangement of this kind, the clutch releasing device is placed under the control of a valve which is actuated by the accelerator pedal. When the pedal occupies its initial position, the valve is open and the clutch is automatically released.

For some purposes a device is combined with this arrangement for neutralizing the connection between the pedal and the valve so that when the driver desires to dispense with the automatic clutch control he can do so by manipulating a knob or handle on the dashboard of the vehicle for putting the neutralizing device into action. It is found, however, that the ordinary neutralizing device is advantageous only when the car is traveling at ordinary speeds, and may cause inconvenience if it remains in operation when the vehicle is running slowly or when the vehicle is temporarily stopped with the engine running.

An object of this invention is to provide an improved neutralizing device which obviates the disadvantages of the ordinary device, and for this purpose the invention comprises means responsive to the motion of the engine or vehicle for bringing the neutralizing device automatically to the position at which it allows the clutch to be actuated when the speed of the engine or vehicle falls below some predetermined amount and the accelerator pedal is released.

Yet another object of the invention is to provide an improved neutralizing device which obviates the disadvantages of the ordinary device, and for this purpose the invention comprises means operated by a voltage regulator for controlling the operation of the aforementioned clutch control mechanism. In one embodiment of the invention, the voltage regulator cuts into operation the clutch controlling mechanism, when the speed of the engine equals or exceeds a predetermined factor.

Other objects of the invention and desirable details of construction and combinations of parts will become apparent from the following description of a preferred embodiment, which description is taken in conjunction with the accompanying drawings, in which.

Figure 1:
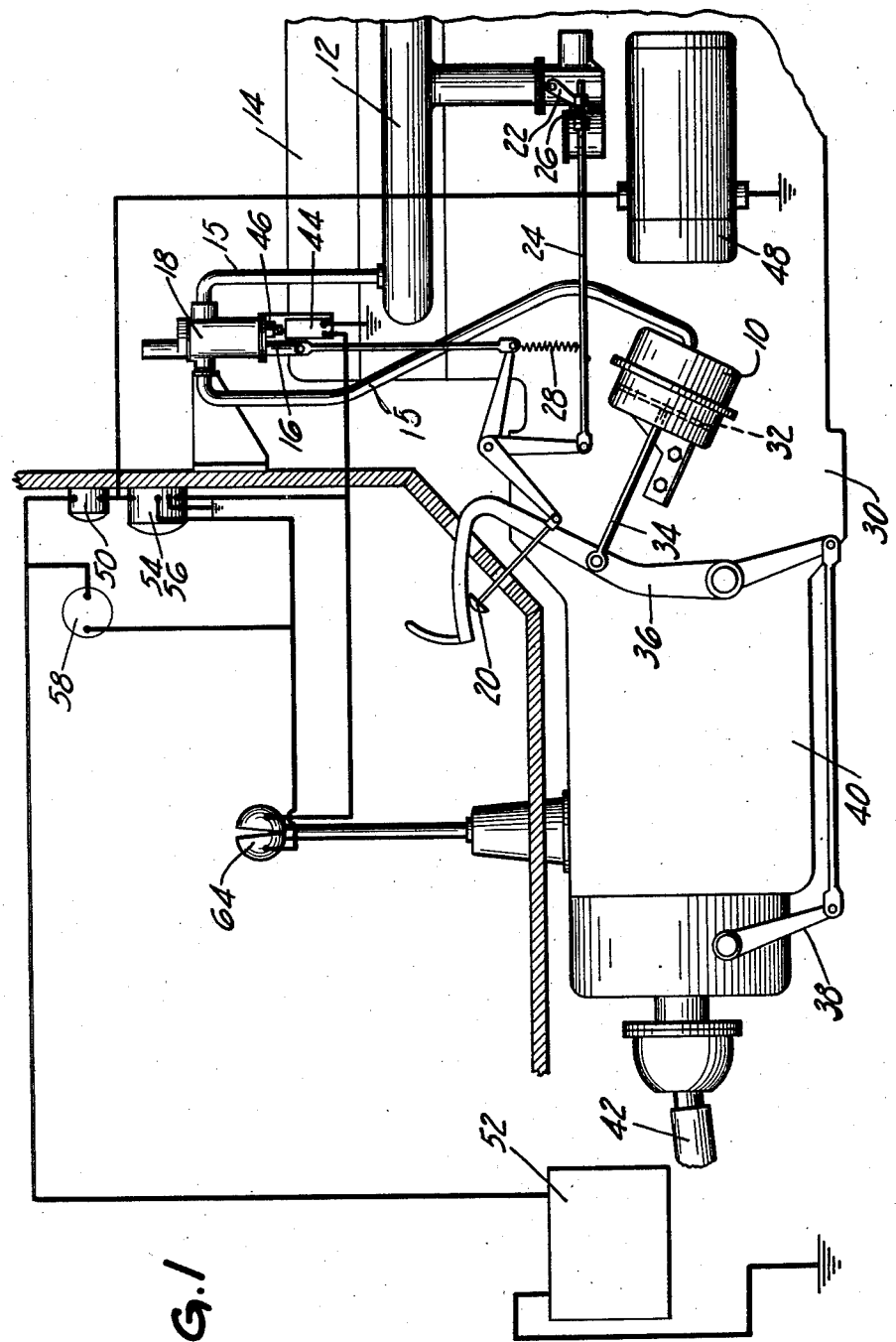
Figure 1 is a diagram illustrating a motor vehicle driving mechanism provided with this invention.

In the arrangement shown in Figure 1, the automatic clutch releasing mechanism comprises a cylinder 10 connected to the intake manifold 12 of the engine 14 through the medium of a conduit 15. A control valve 16, contained in a part 18, is incorporated in said conduit, the valve being actuated by the accelerator pedal 20. The accelerator is connected with a throttle arm 22 by means of a link 24 and a lost motion connection 26. To open the valve the pedal 20 is allowed by the driver to return to its initial position, when the valve 16 is opened by the spring 28, and the clutch contained in the part 30 is automatically released, reengagement of the clutch being effected by the conventional clutch springs (not shown), when the pedal 20 is again depressed and the valve 16 is closed.

A piston 32 in the cylinder 10 is connected by a rod 34 to the usual clutch pedal lever 36 and acts on the clutch through that lever. The same lever is connected to another lever 38 which controls a free-wheel clutch situated between the variable speed gear in the box 40 and the driven shaft 42.

In combination with the above-described mechanism it is usual to provide a neutralizing device under the control of a knob or handle mounted adjacent to the driver, for example on the dashboard, so that the automatic clutch release may be put out of action. This device consists of a second valve in the part 18 which opens or closes the connection between the engine and the clutch releasing mechanism in conjunction with the accelerator pedal operated valve.

Figure 2:
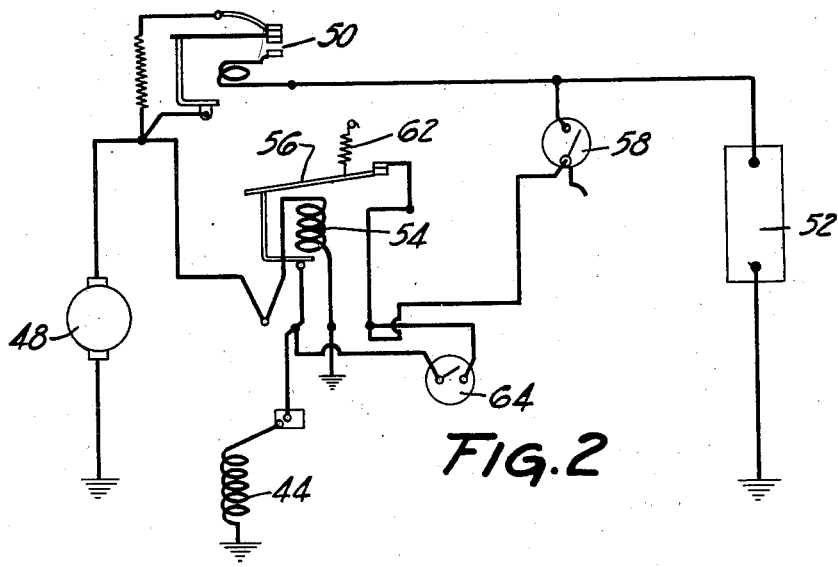
Figure 2 is a diagram of the electric circuit used in the arrangement shown in Figure 1.
Figure 3:
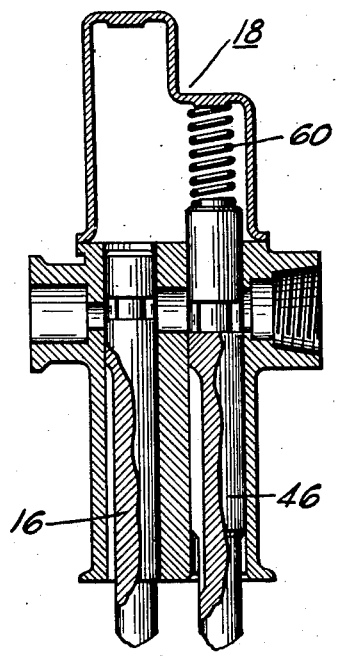
Figure 3 is a sectional elevation of the clutch controlling valve mechanism.

According to this invention, in one form, I dispense with the hand actuated means for operating the neutralizing valve and employ a solenoid or other electromagnet 44 (Figure 2) for actuating the said valve which is indicated by 46. As will be seen in Figure 3, the passage connecting the intake manifold 12 with the cylinder 10 is controlled by both valves 16 and 46. When the accelerator pedal is released by the driver, the valve 16 opens. Otherwise, it is closed. The valve 46 is opened by the electromagnet 44 when the speed of the engine falls below some predetermined limit. The mode of controlling the electromagnet will readily be seen in Figures 1 and 2. At a position between one side of the dynamo 48 and the usual cutout 50, which controls the connection between the dynamo and the battery 52, is connected a voltage coil 54. This coil controls a switch 56 through which current can flow to the coil 44 from the battery 52. The part 58 in the diagram is an ordinary hand switch which controls the coil ignition system of the engine and which is closed when the engine is running. If the dynamo is running at or above some predetermined speed, the coil 54 holds the switch 56 open and no current can flow to the electromagnet 44. Consequently, the valve 46 remains closed under the action of its spring 60. If the speed of the engine falls below that speed, the switch 56 is closed by a spring 62 or other convenient means. Current from the battery can then cause the valve 46 to be opened. The clutch operating mechanism will not operate, however, until the foot is taken off the pedal 20 and the valve 16 is caused to open. If the foot is taken off the pedal 20 when the engine is running at a speed sufficient to keep the switch 56 open, the clutch will not be affected as the valve 46 will then be in the closed position.

The invention is especially useful when the transmission mechanism of the vehicle has combined with it a free-wheel clutch which is normally locked and which is only brought into action when the main clutch is released, for facilitating gear changing.

For some purposes it is desirable to place the valve 46 under the control of the driver, to enable him, for example, to effect a change of gears easily, when the engine is running at a speed high enough to hold the switch 56 open. A further feature of the invention therefore comprises electromagnetic means whereby the neutralizing valve can be opened either by the driver or in response to some predetermined drop in the speed of the engine or vehicle. In this modification, the solenoid 44 is made common to a pair of circuits. One of the circuits contains the switch 56 which operates as already described. The other contains a switch 64 which can be actuated by any member which is moved when, for example, a gear change is about to be made by the driver, such as the gear changing lever. A push button or other hand actuated switch may be combined with the gear change lever, so that when the lever is grasped the switch is closed. Figure 1 shows the switch combined with the knob of the gear change lever, and the arrangement is such that when the knob is grasped the switch is closed and the part 44 is excited by current from the battery for moving the valve 46 to the open position.

By means of this modification the neutralizing valve is opened against the action of its spring, both when the engine or vehicle speed falls sufficiently and when the driver desires to effect a change in the gear box connections. Under all other conditions the neutralizing valve is closed, and the main clutch is not released when the accelerator pedal is allowed to occupy its initial position.

The invention heretofore described is disclosed in my copending application Serial No. 4,705, filed February 2, 1935, this application constituting a division thereof.

While one illustrative embodiment has been described, it is not my intention to limit the scope of the invention to that particular embodiment, or otherwise than by the terms of the appended claims.

I claim:

1. In an engine driven vehicle, a clutch, a generator, a voltage coil, a clutch motor, an engine intake manifold, means including a control valve operable to communicate the motor and manifold, said valve being positionable to intercept the connection to the manifold and to connect the motor to atmosphere, another control valve operable either to communicate the motor and manifold or to cut off said communication, and a solenoid responsive both to an action of the driver and to the operation of the voltage coil for operating the second valve.

2. In an engine driven vehicle, a voltage regulator, an engine intake system, a clutch, a free wheel mechanism, a motor operatively connected to the clutch and free wheel mechanism, a conduit connecting the manifold and motor, a first valve disposed in the conduit adapted to connect the motor to the manifold or to atmosphere, a second valve cooperating with the first valve and adapted to complete or interrupt the connection between the motor and manifold, and means responsive to the operation of the voltage regulator or to an action of the driver for actuating the second valve.

3. In an automotive vehicle provided with an internal-combustion engine and a clutch, power means for operating the clutch including a pressure differential operated motor operably connected with the clutch, and further including valve means for controlling the operation of said motor, said latter means including a cut-out valve, and power means for operating said valve including a solenoid, and means for controlling the operation of said solenoid including a generator, a battery, and a voltage coil, said coil effecting, when the engine is running at or above a predetermined speed, an operation of said valve operating power means to actuate the cut-out valve to render the clutch operating power means inoperative.

4. In a clutch control mechanism for an automotive vehicle provided with a foot operated member, power means for operating the clutch including a pressure differential operated motor, a plurality of valves for controlling the operation of said motor including a three-way valve actuated by the foot operated member, and further including a cut-out valve, means for operating said cut-out valve including an engine driven generator and a voltage coil, the latter being inoperative, when the speed of the engine is decreased to a predetermined factor, to render said second-mentioned means operative to actuate said cut-out valve.

ROBERT LESLIE NEILL.